3 Sheets—Sheet 2.
E. COPE & J. R. MAXWELL.
STEAM VALVES FOR PUMPING AND OTHER ENGINES.
No. 181,045. Patented Aug. 15. 1876.
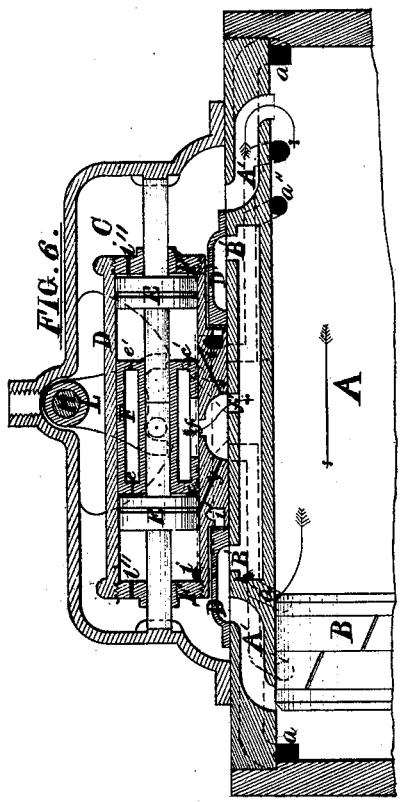
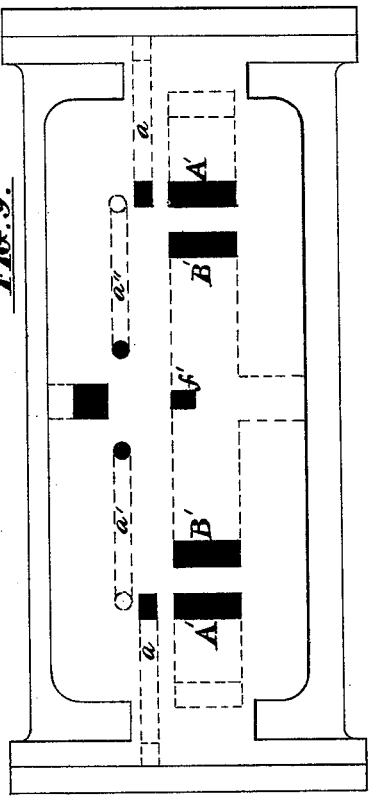
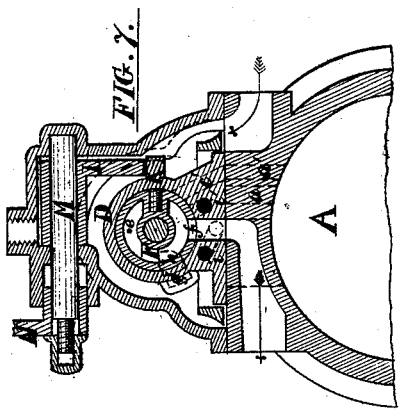
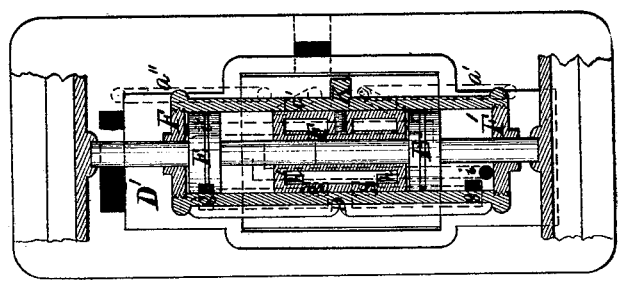
WITNESSES.
Saml. W. Greene
Robt. C. McKinny.
INVENTORS.
Ezra Cope
James R. Maxwell E. COPE & J. R. MAXWELL.
STEAM VALVES FOR PUMPING AND OTHER ENGINES.
No. 181,045. Patented Aug. 15, 1876.
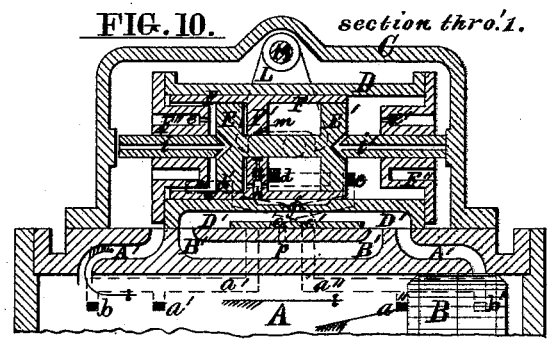
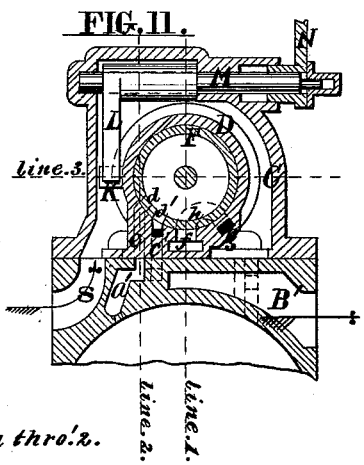
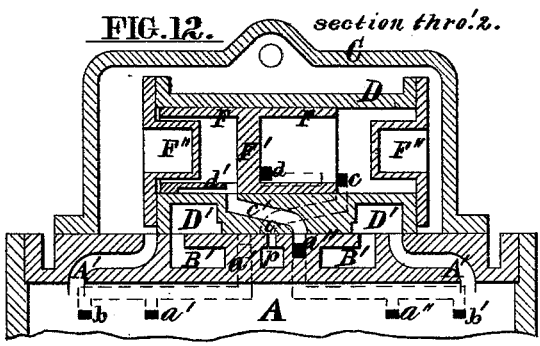
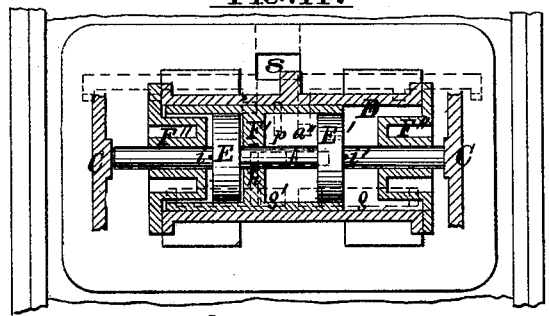
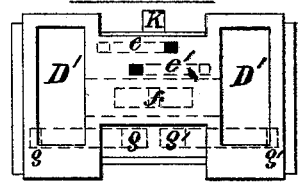
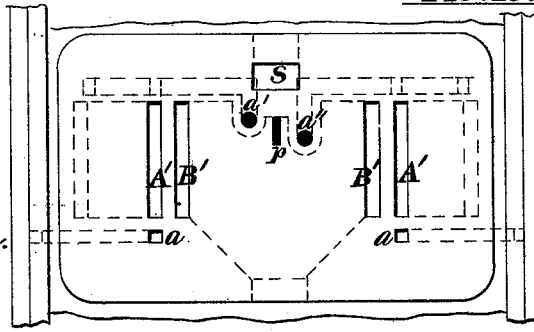
WITNESSES.
S. W. Greene
R. C. McKinney
INVENTORS.
Ezra Cope
Jas. R. Maxwell

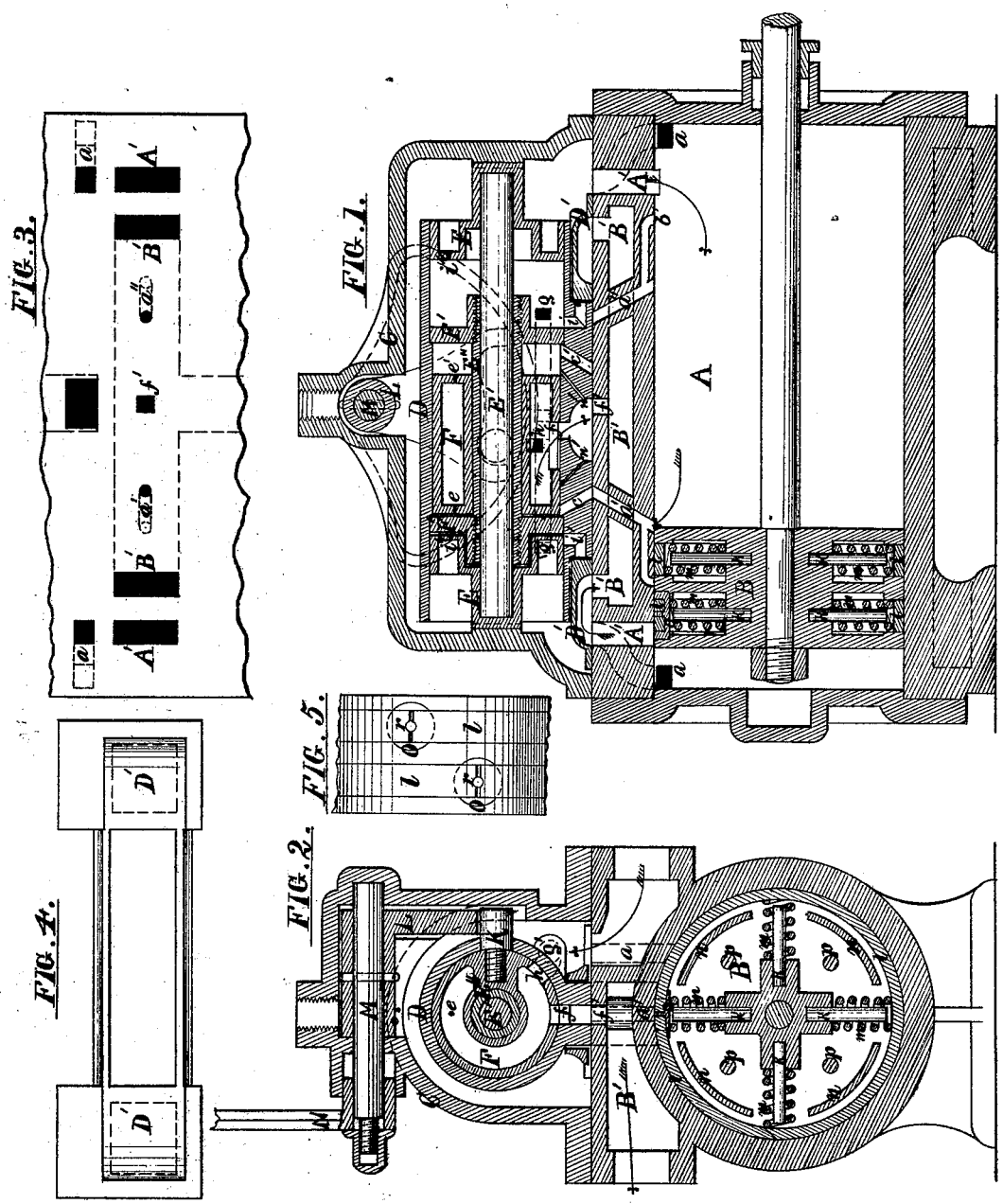

UNITED STATES PATENT OFFICE.

EZRA COPE AND JAMES R. MAXWELL, OF HAMILTON, OHIO.

IMPROVEMENT IN STEAM-VALVES FOR PUMPING AND OTHER ENGINES.

Specification forming part of Letters Patent No. 181,045, dated August 15, 1876; application filed May 18, 1874.

*To all whom it may concern:*

Be it known that we, EZRA COPE and JAMES R. MAXWELL, of the city of Hamilton, county of Butler and State of Ohio, have invented certain new and useful Improvements in Steam-Pumping and other Engines; and that the following is a full and correct description of the same, reference being had to the accompanying drawings, which form a part of the specification.

The nature of our invention consists, first, in improvements upon the valve-gear of that class of steam-engines in which all external valve-gear is dispensed with, and the valves are actuated by steam taken from the main steam-cylinder; second, in the arrangement of ports for cushioning the main steam-piston.

The essential features of our improvements upon the valve-gear of steam-engines consist in the use of stationary pistons, upon which moves an auxiliary or valve-moving cylinder, which actuates the main slide-valve. The motion of this auxiliary cylinder depends upon that of a piston-valve, which we designate the master piston-valve, and which is actuated by steam taken directly from the main steam-cylinder. The construction and action of these parts will be more clearly seen as we proceed with this description.

Figure 1, Sheet 1, Fig. 6, Sheet 2, and Figs. 10 and 12, Sheet 3, are longitudinal sections through the steam-cylinder, piston, and valve-gear. Figs. 2, 7, and 11 are transverse sections through the same parts. Figs. 3, 9, and 15 are plan views of the valve-seat face, showing the position of the ports. Fig. 4, Sheet 1, is a top view of the main slide-valve. Figs. 8 and 14 are horizontal sections through the valve-gear. Fig. 13, Sheet 3, is a bottom view of the main slide-valve.

In all these figures like parts are indicated by the same letters, and arrows show the direction of the moving parts, and the flow of steam.

A is the main steam-cylinder; B, the main piston, and C the steam-chest. A' A' are the main steam-passages. These enter the main steam-cylinder at a short distance from its ends, so that the main piston, in passing over them, cuts off the exhaust, and is arrested in its motion, independent of the reversing of the main slide-valve, upon a cushion formed by the remaining steam or vapor. Supplementary ports $a$ and $a$, Figs. 1 and 3, extend to the ends of the cylinder, and serve to start the piston on its return stroke. Thus the piston is gradually arrested at the end of its stroke, and is slowly started on its return, so avoiding shock or jar in changing its direction.

The valve-gear (see Sheet 1) consists of two stationary heads, E E, separated by the rod E', which is held firmly in position by the ends of the steam-chest C. The auxiliary heads E E are surrounded by a cylinder, D, which moves upon them, and actuates the main slide-valve D'. Surrounding the stem E' is a tube, E'', upon the ends of which are screwed fixed heads F' F', forming a smaller cylinder within the main auxiliary cylinder, in which is a master or supplementary piston-valve, F. The main slide-valve D' is operated by the motion of the auxiliary cylinder D, which has a slight motion in excess of it, in order to open and close the ports $i$ and $i$, which supply high steam from the chest to move the auxiliary cylinder.

The passages $a'$, $a''$, and $c$ $c'$ convey steam from the main steam-cylinder to move the master-valve F. The motion of this master-valve F brings the passages $g$ and $g'$ alternately into communication with the port $h$, for the purpose of exhausting steam from the ends of the auxiliary cylinder D. The small passages $e$ $e'$ and $n'$ $n'$ are continually open to exhaust steam from the ends of the master-valve F. Either one or both sets of these passages may be used. The auxiliary cylinder D is cushioned by the exhaust-port $h$ in the master-valve overrunning the ports $g$ and $g$, and closing the exhaust of steam from the ends of the cylinder.

The lever L, shaft $m$, and handle $n$ are for the purpose of moving the valves by hand. A pin, K, extends from the master-valve F, with which the lever L comes in contact. The lever is forked in order to lessen the arc in which it moves, and that it may remain at rest when the valves are being operated by steam.

The main steam-piston B consists of a shell cast in one piece, and having a central hub, into which are secured pins, upon which are placed springs for holding out the packingrings. The piston, as shown, is believed to be new, and we propose making it the subject of a future application for Letters Patent.

Such being the principal features in the construction, the operation is as follows: All the parts and ports being in the position shown in the drawings, steam enters the steam-chest, and passes through the passage A, on the right, to the main cylinder, forcing the main piston B to the left. When the piston B passes under and opens the small port $a'$, which, by the position of the auxiliary cylinder D, is in communication with passage C, steam from behind the piston passes through $a'$ and $c$ to the left of the master-valve F, forcing it to the right. This brings port $h$ into communication with passage $g$, exhausting steam from the right of the auxiliary cylinder D through them, and thence through $f$ and $f'$ to the common exhaust B'. Steam being thus exhausted from the right of the auxiliary cylinder D, that which has been compressed between the left head E and the auxiliary cylinder expands, forcing the auxiliary cylinder D to the right, as far as its excess of motion over the main slide-valve D', which opens the port $i'$ and closes $i$. Steam now passes through $i'$, and, pressing between the fixed head E and the left end F of the auxiliary cylinder, forces the auxiliary cylinder D, and with it the main slide-valve D', to the right. Steam is now admitted, through the passage A', to the left of the main steam-cylinder, and reverses the stroke of the piston B. When, on its return stroke, the piston B passes under and opens the port $a''$, which has been placed in communication with the passage $c'$ by the movement of the auxiliary cylinder D to the right, steam from behind the piston will pass through $a''$ and $c'$ to the right of the master-valve F, and the same operations as have been described will be repeated in a reverse order, and so on while steam is supplied.

Sheet 2 shows a modification of the preceding arrangement, differing from it, as is the case also in the succeeding modification, only in construction, the principle involved being in all respects the same.

The fixed pistons E E are substituted for the fixed heads E E. The tube E'' surrounding the stem E' is dispensed with. The auxiliary cylinder-heads F' F' are placed at the ends of their cylinder D, outside of the pistons E E, between which the master-valve F works; whereas in the previous case the auxiliary cylinder-heads were within the fixed heads E E.

The pistons E E are grooved, so that any steam which may leak from either side will pass through these grooves to the small passages $y\ y'$, and thence to the common exhaust B. These heads being thus changed it is necessary to cross the steam-passages $i$ and $i$, Figs. 5 and 6, and carry them to opposite ends of the auxiliary cylinder, in order that it may move in the right direction at the proper time. In other respects the arrangements are similar.

Sheet 3 presents a modification of the previous arrangements, in which a master-valve of somewhat different construction is used. This change necessitates other slight changes in the construction. The master-valve F is cylindrical in form, as in the preceding, but is open at the ends, and divided in the center by the partition F'. The auxiliary pistons E E' are fitted to the master-valve F, while the auxiliary cylinder D moves upon the master-valve F. The passages $c$ and $c'$, which communicate with $a'$ and $a''$ to admit steam to move the master-valve, are crossed in the valve-seat, and the master-valve and auxiliary cylinder move in opposite directions. The partition F is grooved around the stem of the auxiliary piston, for the same purpose as described in connection with Fig. 6, Sheet 2. Ports $n$ and $n'$ serve as continuous exhausts from either side of the partition F, and prevent steam from accumulating so as to defeat the action of the master-valve. The passages $a'$ and $a''$ are lengthened, and enter the cylinder a second time at $b$ and $b'$, so placed that when the main piston closes $a'$ or $a''$ $b$ or $b'$ will be open and continue the exhaust from the master-valve F until the main piston has passed under and opened $a'$ or $a''$, when $b$ or $b'$ will be closed. This arrangement of ports prevents the steam remaining in the passages $a'$ or $a''$ after they have been closed by the main piston, or any steam which may accumulate from any other source, from moving the master-valve, and so reversing the main slide-valve before the main piston has made its full stroke. The stem of the auxiliary pistons E and E' has a slight motion endwise sufficient to open and close the passages $i$ and $i'$ in this stem. These passages are substituted for the passages $i$ and $i'$ in the preceding, and their arrangement is fully set forth in our Patent No. 104,616, dated June 21, 1870.

The operation, which is almost identical with that of the previous arrangements, is as follows: The port $a''$ being opened as before, steam passes from the main cylinder through the passages $a''$ and $c'$ to the left of the partition F, and, pressing between it and the piston E, forces the master-valve F to the right. This motion brings the exhaust-port $h$ into communication with the passage $g'$, and steam begins to exhaust from the right of the auxiliary cylinder D. Steam now entering the left of the auxiliary cylinder, opens the port $i$, as has been shown, and high steam passing through $i$ to the left of the auxiliary cylinder presses between the head F'' and the piston E, forcing the auxiliary cylinder, and, consequently, the main slide-valve, to the left. It also presses upon the circumference of the master-valve, keeping it in position, free from "fluttering." The main slide-valve being reversed, steam is admitted to the main cylinder to reverse the stroke of the main piston.

We have described the master piston-valve as being used only for exhausting steam from the ends of the auxiliary cylinder. We do not confine ourselves to this, as by a slight change in the construction steam can be supplied to one end of the auxiliary cylinder while it is being exhausted from the other end. We have constructed engines which worked in this way, dispensing with the ports $i$ and $i'$. In some cases these ports $i$ and $i'$ may be entirely dispensed with, and small high-steam admission-holes, continuously open to the ends of the auxiliary cylinder, substituted.

Having fully described the construction and operation of our invention, what we claim, and desire to secure by Letters Patent, is—

1. The master piston-valve F, in combination with the auxiliary cylinder D, and the ports and passages $a'$ $a''$ $c$ $c'$ $e$ $e'$, substantially as described.

2. The combination of the main slide-valve D', the movable auxiliary cylinder D, the stationary pistons E E', and the master piston-valve F, together with the ports and passages $a'$, $a''$, $c$, $c'$, $e$, $e'$, $f$, $f'$, $g$, $g'$, $h$, $h'$, $i$, $i'$, $i''$, $n$, and $n'$, constructed and arranged as and for the purpose specified.

3. The main steam-passages A A, and the supplementary passages $a$ $a$, in combination with the main slide-valve D' and piston B, substantially as and for the purpose described.

4. The combination of the cylindrical valve, the projecting stud, and the forked lever for moving the valve, substantially as described.

5. In combination with the main piston B and the master piston-valve F, the steam-passages $a'$ $a''$, with the additional ports $b$ $b'$, substantially as described.

EZRA COPE.
JAMES R. MAXWELL.

Witnesses:
SAML. W. GREENE,
ROBT. C. McKINNEY.